(12) United States Patent
Harvey et al.

(10) Patent No.: US 6,269,060 B1
(45) Date of Patent: Jul. 31, 2001

(54) PROGRAMMABLE WRITE SIGNAL GENERATOR

(76) Inventors: Ian E. Harvey, 24602 Paseo Vendaval, Lake Forest, CA (US) 92630; Nugroho Suwito, 47 Rushing Wind, Irvine, CA (US) 92614

( * ) Notice: Subject to any disclaimer, the term of this patent is extended or adjusted under 35 U.S.C. 154(b) by 0 days.

(21) Appl. No.: 09/393,208

(22) Filed: Sep. 9, 1999

(51) Int. Cl.$^7$ .................................................. G11B 7/00
(52) U.S. Cl. ........................................ 369/47.28; 369/59.1
(58) Field of Search ........................ 369/47, 48, 49, 369/50, 54, 58, 59, 116, 47.1, 47.11, 47.15, 47.28, 47.29, 47.33, 47.48, 53.1, 53.34, 59.1, 59.12

(56) References Cited

U.S. PATENT DOCUMENTS 4,907,212 * 3/1990 Pharris et al. .................... 369/54 X
5,042,022 * 8/1991 Ogawa ................................. 369/47

* cited by examiner

Primary Examiner—Muhammad Edun
(74) Attorney, Agent, or Firm—Paul M. Thyfault; Van Pelt & Yi LLP

(57) ABSTRACT

A system and method are disclosed for generating a transition in a laser control signal at a precise point in time. A write strategy processor is configured to input a sequence of data and to determine a transition in a laser control signal from the sequence of data. The transition is specified by a number of pulse clock units and a delay. A write pulse generator is configured to input the number of pulse clock units and the delay and to generate a transition by creating a signal having a transition at the time specified by the number of pulse clock units and delaying the transition by the specified delay.

7 Claims, 7 Drawing Sheets

PROGRAMMABLE WRITE SIGNAL GENERATOR

FIELD OF THE INVENTION

The present invention relates generally to data storage. More specifically, a write pulse signal generator is disclosed for writing data to an optical disc.

BACKGROUND OF THE INVENTION

Numerous formats exist for writing data to an optical disc including CD-R, CD-RW, and DVD. In addition, other formats have been proposed that would allow multilevel data (data that includes more than two possible information states per symbol or mark) to be written to an optical disc. As storage density increases and the mark size decreases for various optical data storage schemes, the ability to precisely control the laser waveform used to write data to an optical disc has become more important. In addition to precisely controlling the waveform, it has also become important to provide flexible control so that different waveforms for different write strategies may be supported. In general, it would be desirable if waveforms with power controlled precisely as a function of time could be reliably generated.

FIG. 1A is a diagram illustrating a CD-R laser writing waveform. The waveform begins at time to where the output power is the write power. The write power is maintained until a time $t_l$ when the power is reduced to the erase power and the waveform continues until $t_f$ when the power is reduced to a low reading level power. The length of the time interval between $t_l$ and $t_f$ is determined by the length of the mark being written. The length of the mark is expressed in terms of a time interval, T, and mark lengths vary from 3T to 11T, with 3T being the shortest mark to 11T being the longest mark. The transition at $t_l$ between the write level and the erase level is programmed and does not vary with the length of the mark being recorded or with previous or future marks. The leading edge of the waveform at $t_0$ maybe changed by an amount $\Delta t$ that is approximately equal to ¼ T. The leading edge is shifted by $\Delta t$ only when the previous mark is a 3T mark, the shortest mark allowed in a CD-R system. Thus, there is some coarse control over the leading edge of the waveform when the previous mark is a 3T mark. However, control is not provided based on future marks and precise control based on previously recorded marks is not provided.

FIG. 1B is a diagram illustrating a laser writing waveform for writing a CD-R mark after a 3T mark has been recorded. The leading edge is shifted by $\Delta t$ and the remainder of the waveform is the same.

It should be noted that, as shown in FIGS. 1A and 1B, the write power and erase power are named based on the names assigned to control lines of the laser driver. The erase power therefore does not necessarily designate a power used to erase a mark. It should also be noted that the minimum power of the laser may be a biasing power that may be designated as the reading power of the laser. The power enabling signals are labeled as write power and erase power for the purpose of designating the selected power enable line that is controlled on the laser driver. It should be recognized that these names are arbitrary and that they are only meant to designate different power levels that may be specified for a laser driver.

The waveform described above for the CD-R write strategy is one example of a standard waveform used to implement a write strategy. In general, different write strategies require different waveforms to write data. It would be useful if a single chip could be used to programmably implement multiple write strategies according to instructions received from a processor. Furthermore, what is needed for more advanced write strategies such as multi-level write strategies is a method of specifying transitions more precisely. Specifically, a method is needed for altering writing waveforms to compensate for intersymbol interference and to accommodate adaptive processing techniques that may vary the writing waveform as a result of feedback.

SUMMARY OF THE INVENTION

A system is disclosed for providing precise control of a laser writing waveform. The leading and trailing edges of the waveform are determined by previous, current, and future marks written to the optical disk. The writing waveform may be varied to write a multilevel mark within a given mark area.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a system and method are disclosed for generating a transition in a laser control signal at a precise point in time. A write strategy processor is configured to input a sequence of data and to determine a transition in a laser control signal from the sequence of data. The transition is specified by a number of pulse clock units and a delay. A write pulse generator is configured to input the number of pulse clock units and the delay and to generate a transition by creating a signal having a transition at the time specified by the number of pulse clock units and delaying the transition by the specified delay.

In one embodiment, a write pulse adjuster for adjusting a transition in a laser control signal by a precise amount of time includes a clock input configured to receive a clock having a clock input period. A coarse delay lock loop has a plurality of coarse delay cells each having a coarse delay period. The coarse delay lock loop locks to the clock input and the coarse delay period of the coarse delay cells is set as a first fraction of the clock input period. A fine delay lock loop has a plurality of fine delay cells each having a fine delay period The fine delay lock loop locks to a periodic signal derived from the outputs of successive coarse delay cells. The fine delay period of the fine delay cells is set as a second fraction of the delay of the coarse delay cells. A variable delay line is configured to delay the transition by a selected number of coarse delay periods and a selected number of fine delay periods.

In one embodiment a write pulse generator for generating a transition in a laser control signal at a precise point in time includes a transition generator that generates a transition. A coarse delay line includes a plurality of coarse delay cells having coarse delay cell outputs. The transition is input to the coarse delay line. A first multiplexer having a first multiplexer output is configured to select one of the coarse delay cell outputs. A fine delay line includes a plurality of fine delay cells having fine delay cell outputs. The first multiplexer output is input to the fine delay line. A second multiplexer has a second multiplexer output configured to select one of the fine delay cell outputs. The transition is delayed by an amount determined by the selected coarse delay output and the selected fine delay output.

In one embodiment, a method of generating a transition in a laser control signal at a precise point in time includes receiving a sequence of data. A transition in a laser control signal is determined from the sequence of data. The transition is specified by a number of pulse clock units and a delay. A transition is generated by creating a signal having a transition at the time specified by the number of pulse clock units and delaying the transition by the specified delay.

In one embodiment, a method of generating a transition in a laser control signal at a precise point in time includes generating a transition. The transition is input to a coarse delay line including a plurality of coarse delay cells having coarse delay cell outputs. One of the coarse delay cell outputs is selected using a first multiplexer having a first multiplexer output. The first multiplexer output is input to a fine delay line including a plurality of fine delay cells having fine delay cell outputs. One of the fine delay cell outputs is selected using a second multiplexer having a second multiplexer output.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, details relating to technical material that is known in the technical fields related to the invention has not been described in detail in order not to unnecessarily obscure the present invention in such detail.

Figure 2A:
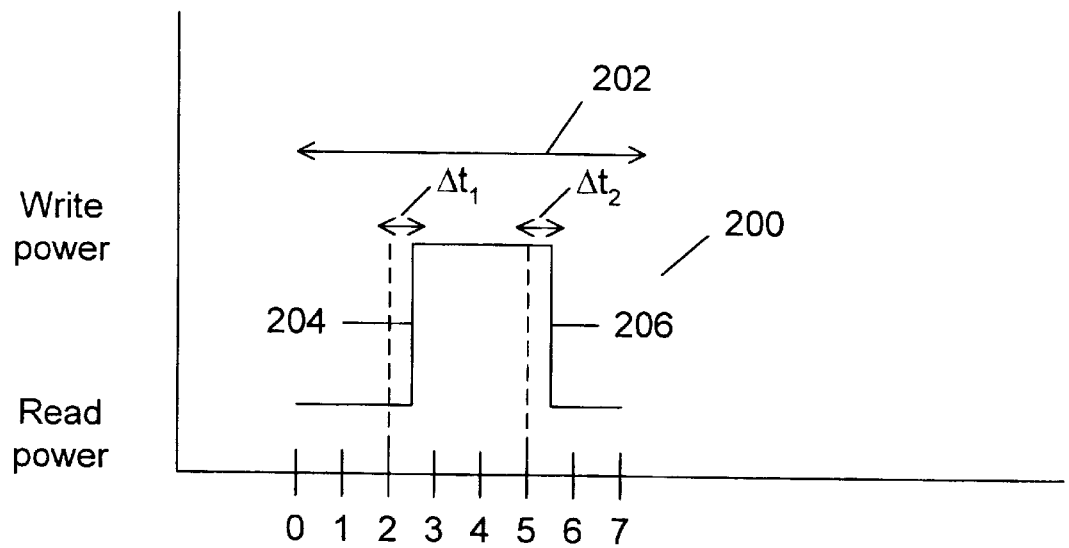
FIG. 2A is a diagram illustrating a writing waveform that writes data to a designated mark area on an optical disc during a mark period.

FIG. 2A is a diagram illustrating a writing waveform 200 that writes data to a designated mark area on an optical disc during a mark period 202. As the optical disk spins, the writing waveform affects a mark area defined by the mark period from time 0 to time 7. For the example mark being written, the time that the write power is enabled is roughly between time 2 and time 5. When the write power is not enabled, the read power is still enabled to provide a biasing power to facilitate tracking and focus control. The leading edge 204 and the trailing edge 206 of the waveform are precisely controlled. The leading edge of the waveform is time shifted by an amount $\Delta t_1$ away from time 2 and the falling edge of the waveform is time shifted or delayed from time 5 by an amount $\Delta t_2$. The amount of the delays $\Delta t_1$ and $\Delta t_2$ is determined based on the previous and future marks being written during the previous and future mark periods.

The write enable control signal needed to generate this waveform is synthesized by first creating a pulse that has a leading edge at time 2 and a falling edge at time 5 and is therefore 3 units long. It should be noted that the time units of the pulse are determined by the speed at which the optical disk is rotating. For the purpose of this disclosure, the units will be referred to as pulse clock units. The pulse clock units are adjusted according to the rotation speed of the disk being written. Using the techniques described below, each of the edges that comprise a writing waveform may be placed in a programmable manner. The location of the edges may be calibrated based on a precompensation strategy that precompensates for intersymbol interference or other effects by adjusting the writing waveform. In one embodiment, intersymbol interference is canceled. In another embodiment, intersymbol interference is controlled.

Figure 2B:
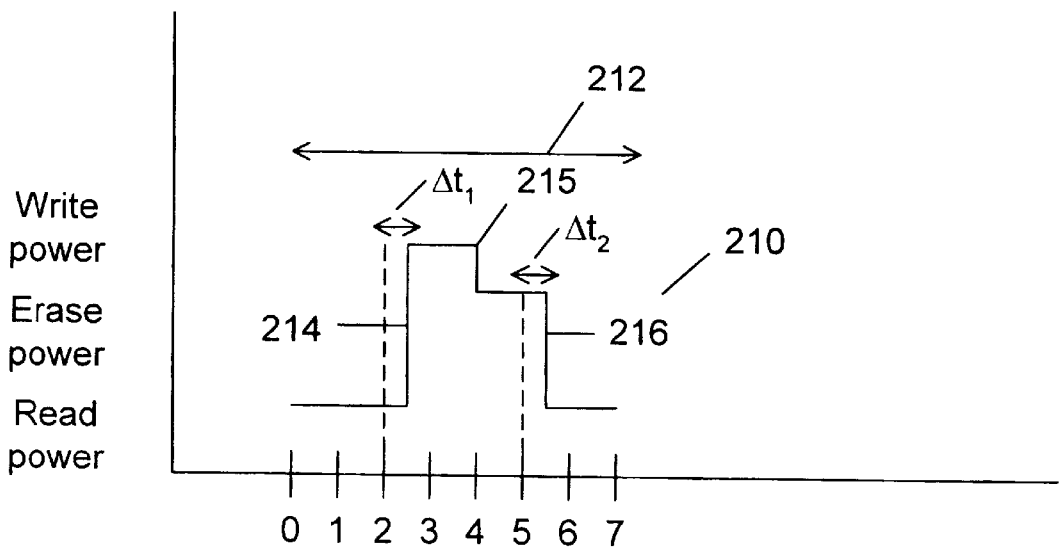
FIG. 2B is a diagram illustrating an alternative write strategy also used to write a multilevel mark on an optical disk.

FIG. 2B is a diagram illustrating an alternative write strategy also used to write a multilevel mark on an optical disk. The mark area being written corresponds to a mark period 212 in which a variable size writing pulse 210 is included. For the example mark being written, the pulse duration is between approximately time 2 and time 5. The leading edge of the pulse 214 is delayed from time 2 by an amount $\Delta t1$ and the trailing edge of the pulse 216 is delayed by time 5 by an amount $\Delta t2$. $\Delta t1$ and $\Delta t2$ are determined based on the previous, current, and future marks being written in the current mark area and adjacent mark areas. The control pulse also includes a transition at 215 between the write power and the erase power.

In one embodiment, transition 215 is preset at an offset from the leading edge and is not varied according to the marks being written. Transition 215 may also be preset to be offset from the trailing edge or may be preset to be centered between the leading edge and the trailing edge of the waveform. Transition 215 is also adjusted in some embodiments.

The waveform shown in FIG. 2B may be synthesized by a writing power enable signal that rises at leading edge 214 and falls at transition 215 and with an erase power pulse that rises at leading edge 214 and falls at trailing edge 216. A logic circuit is implemented so that when the write power and the erase power are both enabled, the write power is output. The write power pulse and the erase power pulse may be generated by generating a write pulse that is approximately 2 pulse clock units long and generating an erase pulse that is approximately 3 pulse clock units long. The leading and trailing edge of the write and erase pulses are adjusted so that the leading and trailing edge of the composite pulse, as well as the transition from the write power to the erase power may be adjusted.

Figure 1A:
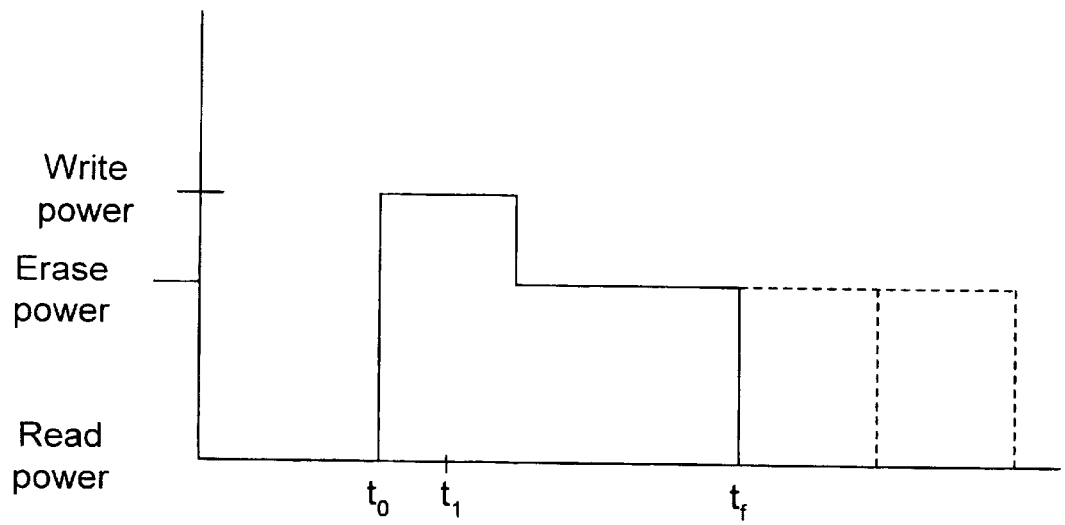
FIG. 1A is a diagram illustrating a CD-R laser writing waveform.
Figure 1B:
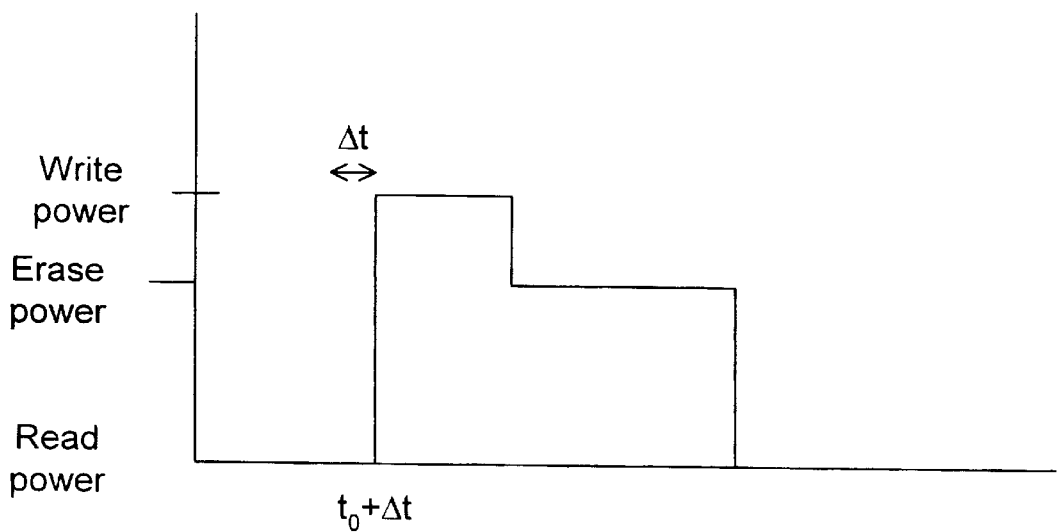
FIG. 1B is a diagram illustrating a laser writing waveform for writing a CD-R mark after a 3T mark has been recorded.

Thus, the two example writing waveforms may be synthesized using a pulse generated to last a certain number of pulse clock units and then adjusting the leading edge and the trailing edge of the pulse. The edges of the pulse are adjusted by amounts determined by previous and future marks, as well as the current mark being written in order to cancel or control intersymbol interference. The example waveforms may be used to write multilevel information within the mark area. That is, the mark area may be written with more than two possible states using the waveforms shown. In contrast, the CD-R waveform illustrated in FIG. 1 extends across a greater mark area when different data is written. The waveforms illustrated in FIGS. 2A and 2B write multilevel data within a single mark area.

More complex pulse shapes such as the one shown in FIG. 2B are derived by superimposing one or more write power pulses and erase power pulses generated by the same method as the simpler waveform shown in FIG. 2A. As shown below, these waveforms may be generated using a writing pulse generating circuit that responds to a control message generated by a write strategy processor.

Figure 3:
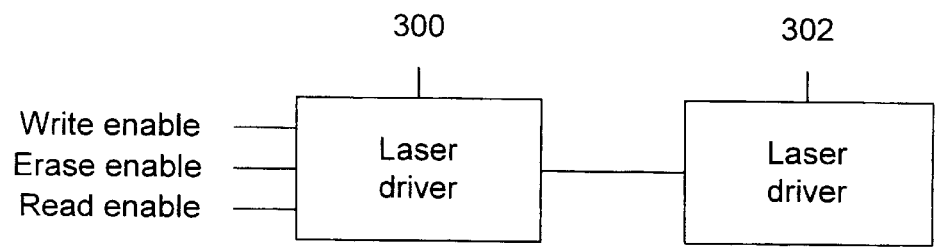
FIG. 3 is a block diagram illustrating a laser driver and a writing laser.

FIG. 3 is a block diagram illustrating a laser driver 300 and a writing laser 302. Writing laser 302 may also function as a reading laser. Laser driver 300 is connected to control lines including a write enable control line, an erase enable control line, and a read enable control line. The names used to refer to the control lines are based on possible functions that the control lines may have in different applications, but are not necessarily descriptive of the signals on the control lines in the examples described herein. The control lines enable different output powers from laser driver 300 and those output powers may in fact correspond to write enable, erase enable, and read enable signals or the different output powers may correspond to different levels of write signals and a biasing signal. In the current application, the write enable and erase enable signals are used to form the writing waveform and the read enable signal is enabled to provide a bias power to the writing laser. The common designations of the laser driver control lines are provided here for convenience only and it should be appreciated that the different control lines merely control or enable different output powers.

In other embodiments, more than two powers other than the bias power and corresponding transitions are included. Each power level is controlled using a pulse that is precisely located in time using the techniques described herein. In some embodiments, more than two enable lines are used to control the output by the laser of such different powers. In other embodiments, the power controlled by a given enable line is adjusted to provide a different power when the enable line is activated. In general, an arbitrary number of waveforms may be written including an arbitrary number of power levels with time adjusted waveforms used to control each power level transition in a precise manner.

When each of the control lines are enabled, the laser driver output power to the write laser corresponds to a certain preset level. It is through the precise control of the timing of the signals generated for the control lines that the output waveform of the laser driver is made to correspond to the desired write strategy waveform. It should also be noted that additional control lines are included to enable other power levels of the laser driver in some embodiments.

Figure 4A:
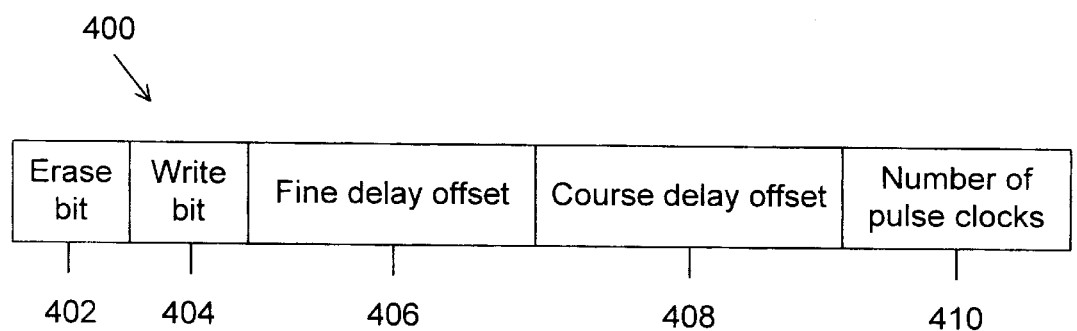
FIG. 4A is a diagram illustrating a control message generated by a write strategy processor for the purpose of specifying a writing waveform to a precompensation write pulse generator.

FIG. 4A is a diagram illustrating a control message generated by a write strategy processor for the purpose of specifying a writing waveform to a precompensation write pulse generator. As described in connection with FIGS. 2A and 2B, the leading edge and the trailing edge of the writing waveform may be specified by providing a number of pulse clock units that define the location and duration of a pulse and then delaying the edges by amounts determined by the current mark as well as previous and future marks. The general location of the pulse is specified by the number of pulse clock units, which are use to generate a waveform that is the specified number of pulse clock units long. The waveform is then fed into a series of delay lines that proved a coarse delay and a fine delay as described below that precisely locate the pulse temporally.

The message format shown prescribes the number of pulse clock units and also prescribes the delay as well as whether the write power enable control signal transition or the erase power enable control signal transition is being generated. Control message 400 includes an erase bit 402, a write bit 404, a fine delay offset 406, a coarse delay offset 408, and a number of pulse clocks 410. Erase bit 402 indicates whether or not an erase enable control signal is being generated. Write bit 404 determines whether or not a write enable control signal transition is being defined. It should be noted that both erase bit 402 and write bit 404 may be set, in which case the message will cause both the erase enable control signal and the write enable control signal to transition. In one embodiment, separate delay lines are used for the write and erase control signals, so that the write bit and erase bits are not used.

Fine delay offset 406 and coarse delay offset 408 combine to define the point in time that the transition occurs. The transition is offset in time from the time that is specified by the number of pulse clock units specified in number of pulse clocks 410. The use of the fine delay offset and coarse delay offset bits is described further in connection with FIG. 6. In one embodiment, the fine delay offset and coarse delay offset are each 4 bits and the number of pulse clocks is 3 bits. The mark period is divided into 8 pulse clock units and each transition is specified by a pulse clock unit, a coarse delay offset from the pulse clock unit, and a fine delay offset from the pulse clock unit. In one embodiment, the nominal position in time of a pulse that corresponds to a zero delay is defined as being output in the middle of the delay lines. A selected output that is after the middle of the delay lines has a positive delay and a selected output before the middle of the delay lines has a negative delay. Thus, in such a center tapped system, the delay can be either positive or negative. It should also be noted that the circuit may also be programmed to generate an inverted waveform in some embodiments.

Figure 4B:
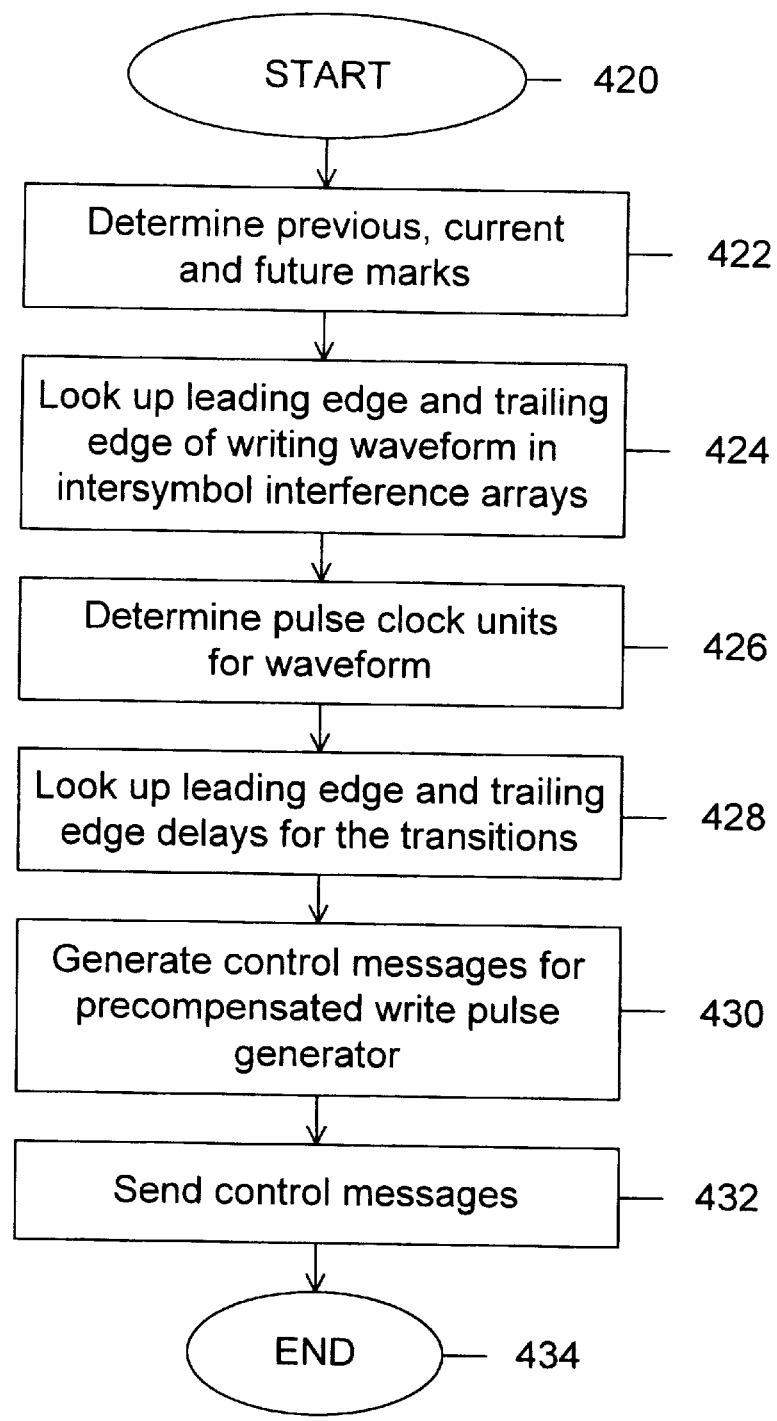
FIG. 4B is a flow chart illustrating a process for deriving and sending a control message based on the marks being written to the optical disk.

FIG. 4B is a flow chart illustrating a process for deriving and sending a control message based on the marks being written to the optical disk. The process starts at 420. In a step 422, the write strategy processor determines the previous, current and future marks being written. Next, in a step 424, the write strategy processor looks up the leading edge and trailing edge of the writing waveform in an array or matrix that stores timing data for the leading and trailing edges. The timing data is derived for the purpose of controlling or eliminating intersymbol interference. In one embodiment, the matrix is initialized by writing and reading a test pattern of symbols to the disc and determining the intersymbol interference, then determining signal levels to control the intersymbol interference.

Based on the leading and trailing edges stored in the intersymbol interference arrays, the write strategy processor determines pulse clock units for the messages that specify those transitions. Next, in a step 428, the write strategy processor determines leading edge and trailing edge delays for the transitions. In a step 430, the write strategy processor generates the control messages for a precompensated write pulse generator that will read the control messages and generate laser write enable and laser erase enable signals to control the writing laser based on the information contained in the control messages. The precompensation write pulse generator is described in further detail in connection with FIG. 6. The process ends at 434.

Thus, a control message is generated based on the previous, current, and future marks being written to the optical disk. The control message specifies either a leading edge or a trailing edge transition for the writing waveform. The message may specify such a transition for an erase enable signal, a write enable signal, or both an erase enable signal and a write enable signal. The control message specifies a transition by specifying a number of pulse clock units and then a delay that precisely locates the transition in time.

Figure 5:
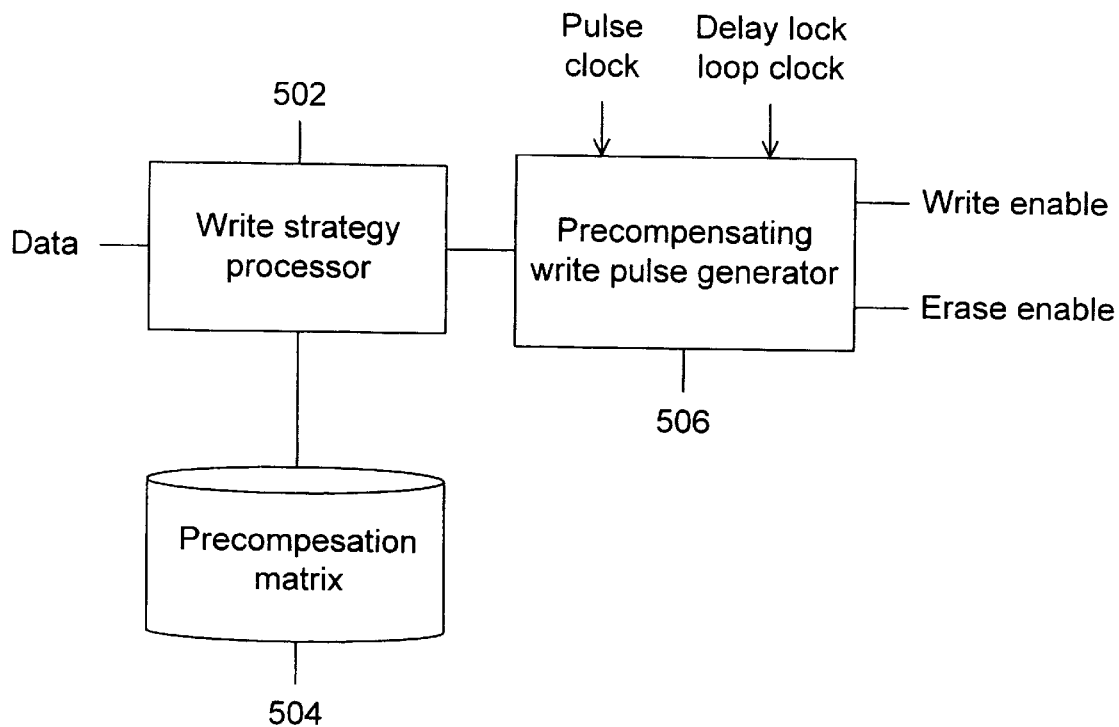
FIG. 5 is a block diagram of a precompensating write strategy system for generating the laser write enable control signal and the laser erase enable control signal for a laser driver.

FIG. 5 is a block diagram of a precompensating write strategy system for generating the laser write enable control signal and the laser erase enable control signal for a laser driver. Write strategy processor 502 receives data as an input. Write strategy processor 502 access a precompensation matrix 504 that includes exact specifications of the transitions for a writing waveform for a mark given the previous, current, and future marks being written. Precompensation matrix 504 may be a matrix or may be any other type of data structure that facilitates write strategy processor 502 deriving the necessary waveform transitions from the input data.

Write strategy processor encodes the transitions in a control message in a form such as the control message shown in FIG. 4A and sends the control message to a precompensating write pulse generator 506. Precompensation write pulse generator 506 is described in further detail in FIG. 6. A pulse clock and a delay lock loop clock are also input into precompensating write pulse generator 506. The output of precompensating write pulse generator 506 is a laser write enable and a laser erase enable signal.

Figure 6:
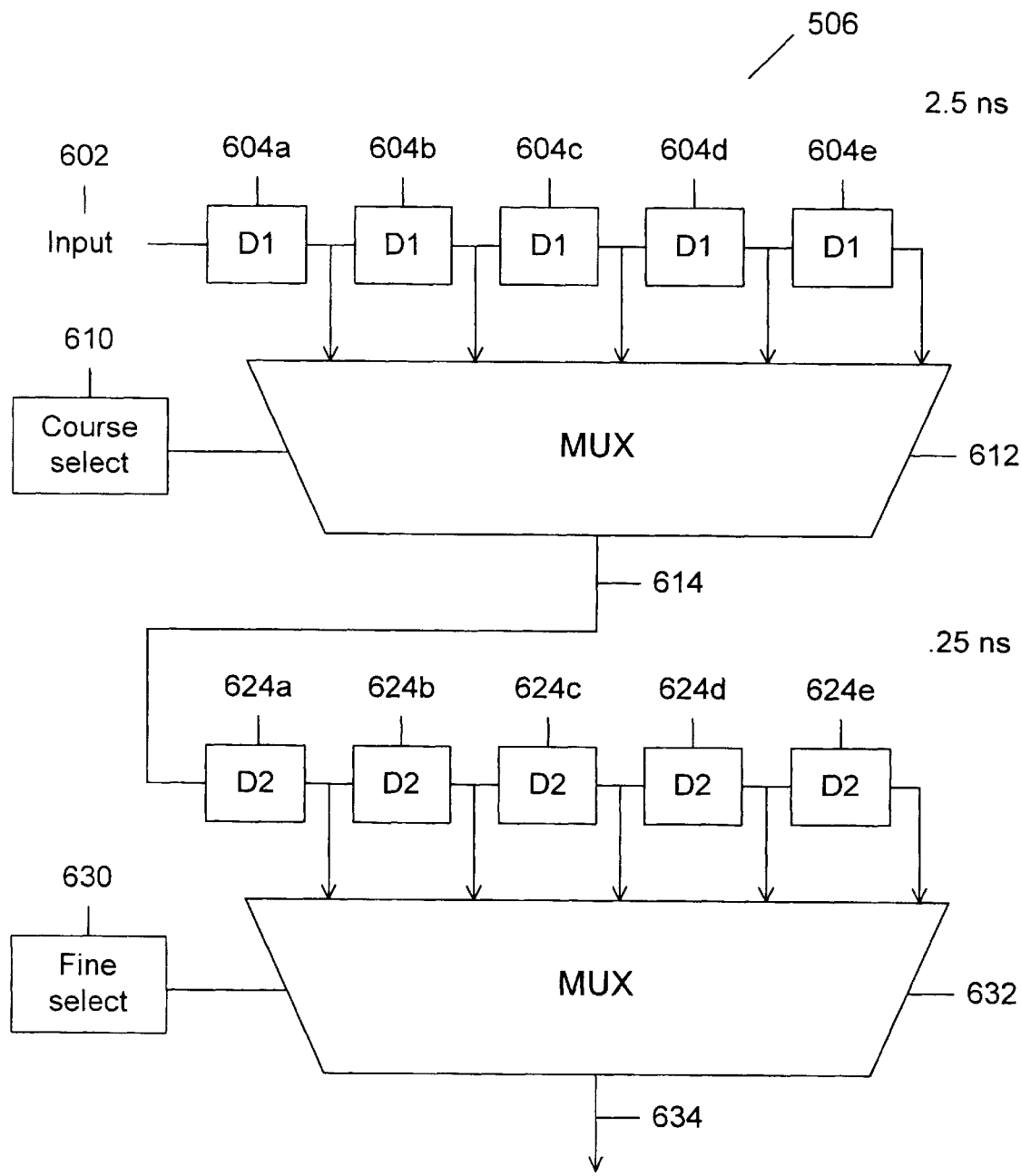
FIG. 6 is a block diagram illustrating a precompensating write pulse generator that generates a transition based on the number of pulse clock units specified in a control message and delayed by a coarse delay offset and a fine delay offset.

FIG. 6 is a block diagram illustrating a precompensating write pulse generator that generates a transition based on the number of pulse clock units specified in a control message and delayed by a coarse delay offset and a fine delay offset. The leading edge or trailing edge transition is input at 602. The transition is positioned in time according to the number of pulse clock units specified in the control message. Input 602 is connected to a series of delay cells 604a, 604b, 604c, 604d, and 604e. The delay cells mirror the delay cells included in the coarse delay lock loop described in FIG. 7. In one embodiment, the delay lines each provide a 2.5 ns delay and 10 such delay lines are provided. It should be noted that only 5 delay lines are shown in FIG. 6 for the purpose of simplicity and that different numbers of delay lines are used in different embodiments.

A coarse select signal 610 is input to the select line of a multiplexer 612. The inputs to multiplexer 612 are the outputs of each of the delay lines. Thus, the coarse select signal, which may be derived directly from the coarse delay offset contained in the control message, selects one of the inputs to the multiplexer that are derived from the outputs of the delay lines. In this manner, the output of multiplexer 612 at 614 is a transition located in time by a specified number of pulse clock units and a coarse delay determined by the coarse delay offset. In one embodiment, the pulse clock units are provided using an external 40 MHz clock. The output of multiplexer 614 is input to a fine delay set of delay cells 624a, 624b, 624c, 624d, and 624e. The delay cells mirror the delay cells included in the fine delay lock loop described in FIG. 7. The outputs of each of the fine delay lines are input to a multiplexer 632 and the select line of multiplexer 632 is controlled by a fine select signal 630 which is derived from the fine delay offset bits in the control message. Thus, the fine delay specified in the control message locates the transitions even more precisely in time than the coarse delay selected so that an extremely precise transition is defined at the output 634 of multiplexer 632. Thus, the control message generated by the write strategy processor is translated to precisely determined transitions that are used as power control enable signals for the laser driver.

Figure 7:
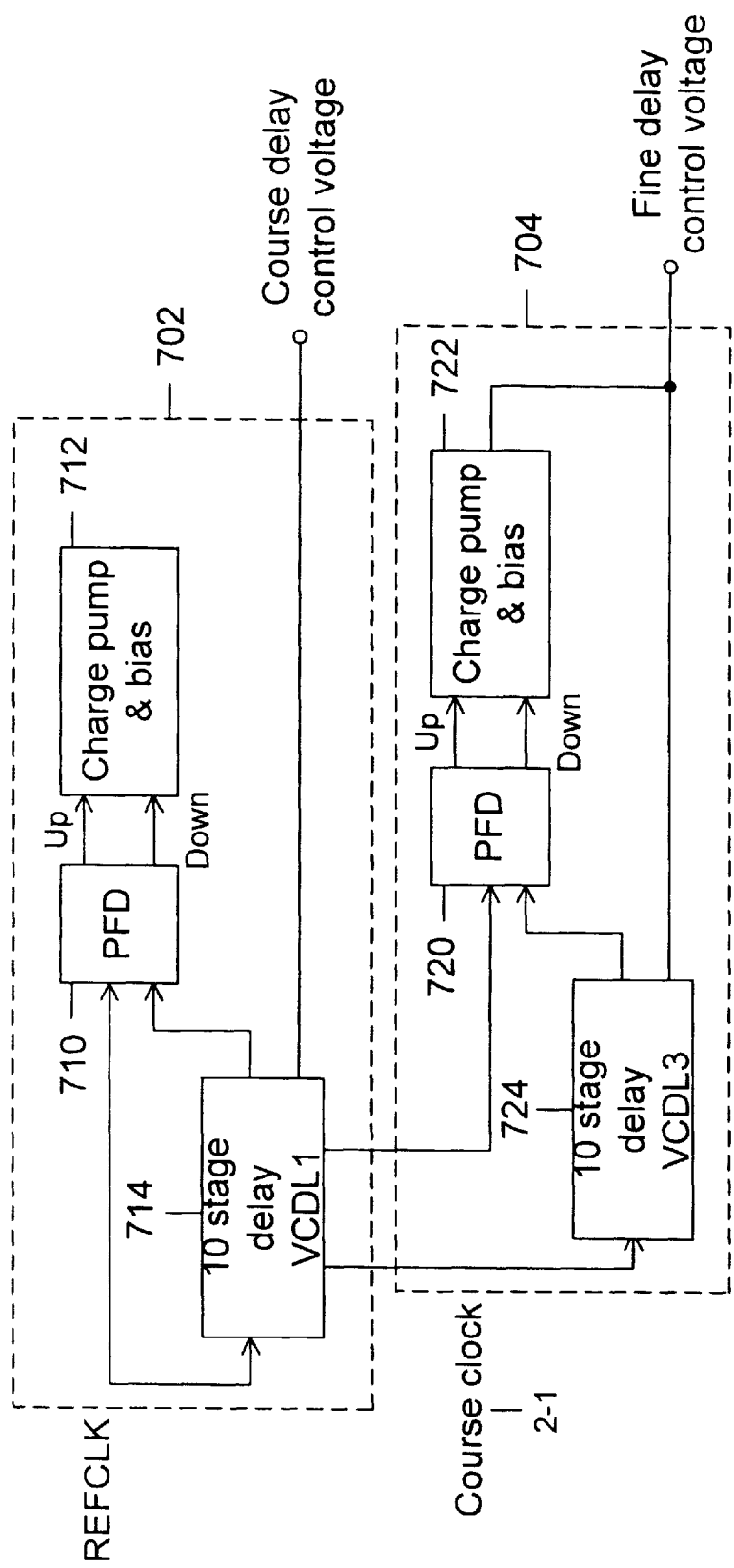
FIG. 7 is a block diagram illustrating a pair of delay lock loops (DLL's) used to derive a coarse delay control voltage and a fine delay control voltage that are used to precisely specify a time interval.

FIG. 7 is a block diagram illustrating a pair of delay lock loops (DLL's) used to derive a coarse delay control voltage and a fine delay control voltage that are used to precisely specify a time interval. The derived coarse delay and fine delay voltages are input to the coarse delay and fine delay stages shown in FIG. 6 to precisely determine the delay times. The coarse delay and fine delay stages in the write pulse generator shown in FIG. 6 mirror the delay stages in the delay lock loop. In one embodiment, the delay is programmable in 250 ps increments over a range of approximately 55 ns.

The design includes two DLL's: a course resolution DLL (DLC) 702 and a fine resolution DLL (DLF) 704. DLC 702 and DLF 704 contain similar architectures. The DLL's are designed using standard techniques. DLC 702 includes a phase detector (PFD) 710, charge pumps and bias circuitry 712, clamps, and a 10 stage voltage controlled delay line (VCDL) 714. Likewise, DLC 704 includes a phase detector (PFD) 720, charge pumps and bias circuitry 722, clamps, and a 10 stage voltage controlled delay line (VCDL) 724.

A 40 MHz reference clock (REFCLK) is the primary input to the DLL. All timing information is derived from it. It feeds the 10 stage delay block 714 and PFD 710 of DLC 702. The outputs of the PFD are the UP and DOWN signals. Their duty cycle is proportional to the PFD input phase difference. The UP and DOWN signals feed the charge pump, which generates the voltage that controls VCDL 714. UP pulses generate the control voltage, which then generates currents for each cell of VCDL 714. The delay of VCDL 714 is proportional to the bias current.

When the DLC is in the locked state, the delay through VCDL 714 is 25 ns. Since VCDL 714 contains 10 stages, the delay through each stage is 2.5 ns. The control voltage derived for VCDL 714 is applied to the mirrored delay cells shown in FIG. 6 so that the delay of those cells matches the delay of the cells in the DLC.

Two clocks from successive states (I-1 and I) of VCDL 714 of DLC 702 are the primary inputs to DLF 704. When the DLC is in lock, these two clocks will be 2.5 ns apart. The clock from stage I-1 feeds VCDL 724, and the clock from stage I feeds PFD 720 of the DLF. The output of VCDL 724 also feeds PFD 720. The loop functions as described for the DLC. The difference is that the complete delay of VCDL3 is only 2.5 ns. The delay per stage for the DLF is then 2.5 ns/10=250 ps. The control voltage derived for VCDL 724 is applied to the mirrored delay cells shown in FIG. 6 so that the delay of those cells matches the delay of the cells in the DLF.

Thus, the delay lines used to derive the inputs for the multiplexers shown in FIG. 6 are precisely derived using the control voltages derived from the delay lock loops. The delays produced are precisely defined fractions of an external clock period are independent of fluctuation in temperature or power supply voltage. In this manner, extremely precise control of the laser writing waveform transitions can be achieved. In one embodiment, the coarse delays are 2.5 ns and the fine delays are 0.25 ns so that control over the transitions two within 0.25 ns is achieved.

A system for selecting and generating precisely timed laser writing waveform transitions has been disclosed. Both the leading edge transition and the trailing edge transition of a laser writing waveform are determined based on the previous, current, and future marks being written to an optical disk. The precise determination of the transitions is especially useful in a multilevel system where a multilevel signal is represented by the size of a mark defined by the laser writing waveform within a mark area. Both the timing and the power of laser pulses is controlled using the techniques described.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A write pulse adjuster for adjusting a transition in a laser control signal by a precise amount of time comprising:

a clock input configured to receive a clock having a clock input period;

a coarse delay lock loop having a plurality of coarse delay cells each having a coarse delay period wherein the coarse delay lock loop locks to the clock input and the coarse delay period of the coarse delay cells is set as a first fraction of the clock input period;

a fine delay lock loop having a plurality of fine delay cells each having a fine delay period wherein the fine delay lock loop locks to a periodic signal derived from the outputs of successive coarse delay cells and the fine delay period of the fine delay cells is set as a second fraction of the delay of the coarse delay cells; and a variable delay line configured to delay the transition by a selected number of coarse delay periods and a selected number of fine delay periods.

2. A write pulse adjuster as recited in claim 1 wherein the first fraction and the second fraction are the same.

3. A write pulse adjuster as recited in claim 1 wherein the first fraction and the second fraction are equal to one tenth.

4. A write pulse generator for generating a transition in a laser control signal at a precise point in time comprising:

a transition generator that generates a transition;

a coarse delay line including a plurality of coarse delay cells having coarse delay cell outputs wherein the transition is input to the coarse delay line;

a first multiplexer having a first multiplexer output configured to select one of the coarse delay cell outputs;

a fine delay line including a plurality of fine delay cells having fine delay cell outputs wherein the first multiplexer output is input to the fine delay line;

a second multiplexer having a second multiplexer output configured to select one of the fine delay cell outputs;

whereby the transition is delayed by an amount determined by the selected coarse delay output and the selected fine delay output.

5. A write pulse generator for generating a transition in a laser control signal as recited in claim 4 wherein the amount that the transition is delayed is determined by both previous and future data.

6. A method of generating a transition in a laser control signal at a precise point in time comprising:

generating a transition;

inputting the transition to a coarse delay line including a plurality of coarse delay cells having coarse delay cell outputs;

selecting one of the coarse delay cell outputs using a first multiplexer having a first multiplexer output;

inputting the first multiplexer output to a fine delay line including a plurality of fine delay cells having fine delay cell outputs; and selecting one of the fine delay cell outputs using a second multiplexer having a second multiplexer output.

7. A method of generating a transition in a laser control signal at a precise point in time as recited in claim 6 wherein the amount that the transition is delayed is determined by both previous and future data.

* * * * *